(12) United States Patent
Walsh, Jr.

(10) Patent No.: US 12,114,648 B1
(45) Date of Patent: Oct. 15, 2024

(54) FISHING LURE WITH ACTUATED HOOKS

(71) Applicant: William C. Walsh, Jr., Madison, WI (US)

(72) Inventor: William C. Walsh, Jr., Madison, WI (US)

( * ) Notice: Subject to any disclaimer, the term of this patent is extended or adjusted under 35 U.S.C. 154(b) by 0 days.

(21) Appl. No.: 18/140,092

(22) Filed: Apr. 27, 2023

Related U.S. Application Data

(63) Continuation of application No. 17/211,901, filed on Mar. 25, 2021, now Pat. No. 11,684,052.

(51) Int. Cl.
*A01K 85/02* (2006.01)
*A01K 83/02* (2006.01)
*A01K 85/00* (2006.01)

(52) U.S. Cl.
CPC ............ *A01K 83/02* (2013.01); *A01K 85/027* (2022.02); *A01K 85/023* (2022.02)

(58) Field of Classification Search
CPC .. A01K 85/011; A01K 85/012; A01K 85/013; A01K 85/019; A01K 85/026; A01K 85/027; A01K 85/028; A01K 85/029; A01K 85/1803; A01K 85/1807; A01K 85/1811; A01K 85/1813; A01K 85/1817; A01K 85/1821; A01K 85/1823; A01K 85/1827; A01K 85/1831; A01K 85/1833; A01K 85/1837; A01K 85/1841; A01K 85/1843; A01K 85/1847; A01K 85/1851; A01K 85/1853; A01K 85/1857; A01K 85/1861; A01K 85/1863; A01K 85/1867; A01K 85/1871; A01K 85/1873; A01K 85/1877; A01K 85/1881; A01K 85/1883; A01K 85/1887; A01K 85/1891; A01K 85/1893; A01K 85/1897; A01K 85/00; A01K 85/02; A01K 85/021; A01K 85/022; A01K 85/023; A01K 85/024; A01K 85/025; A01K 83/045; A01K 83/02; A01K 83/025
USPC ..................................................... 43/33–37
See application file for complete search history.

(56) References Cited

U.S. PATENT DOCUMENTS

| | | | |
|---|---|---|---|
| 2,619,756 A | 12/1952 | Hunicke et al. | |
| 3,266,185 A | 8/1966 | Abramson, Jr. | |
| 2011/0119984 A1 | 5/2011 | Tsai | |
| 2023/0189775 A1* | 6/2023 | Han ....................... | A01K 85/16 43/42.1 |

* cited by examiner

*Primary Examiner* — Morgan T Jordan
(74) *Attorney, Agent, or Firm* — Donald J. Ersler

(57) ABSTRACT

A fishing lure with actuated hooks preferably includes a fish housing, a hook retainer, a hook cam, a pull pin and at least two hooks. The hook retainer pivotally retains pivoting ends of the at least two hooks. A front of the hook retainer is retained in fish housing. The hook cam preferably includes a cone base and at least two hook loops. The pivoting ends of the at least two hooks are inserted through the at least two hook loops. The hook cam does not move axially relative to the pull pin. The fish housing includes at least two hook slots to allow the at least two hooks to extend outward. A compression spring biases the hooks to stay in the fish housing. The at least two hooks are pushed outward by axial movement of the hook cam relative to the fish housing when the pull pin is pulled.

17 Claims, 4 Drawing Sheets

FISHING LURE WITH ACTUATED HOOKS

CROSS-REFERENCES TO RELATED APPLICATIONS

This is a continuation patent application, which takes priority from patent application Ser. No. 17/211,901, filed on Mar. 25, 2021.

BACKGROUND OF THE INVENTION

Field of the Invention

The present invention relates generally to fishing and more specifically to a fishing lure with actuated hooks, which extends a plurality of hooks, when a fishing line is pulled.

Discussion of the Prior Art

U.S. Pat. No. 2,619,756 to Hunicke et al. discloses a fishing lure, including fish actuated impaling means. U.S. Pat. No. 3,266,185 to Abramson Jr. discloses a fish lure. Patent publication no. 2011/0119984 to Tsai discloses a structure to conceal fishhook inside false fish.

Accordingly, there is a clearly felt need in the art for a fishing lure with actuated hooks, which provides a plurality of hooks that are biased to stay inside a fishing lure housing unless a fishing line is pulled.

SUMMARY OF THE INVENTION

The present invention provides a fishing lure with actuated hooks, which extends a plurality of hooks, when a fishing line is pulled. The fishing lure with actuated hooks (fishing lure) preferably includes a fish housing, a hook retainer, a hook cam, a pull pin, a plurality of hooks and a compression spring. Each hook includes a hook end, a swing arm and an eyelet. The hook end includes a barb end and a rod end. The swing arm extends outward substantially perpendicular to the rod end. The swing arm is terminated with the eyelet. The hook retainer preferably includes a base member, at least two yokes and a retention projection. The at least two yokes extend from an outer perimeter of the base member. Each yoke includes a first ear and a second ear. A distance between inner surfaces of the first and second ears is sized to receive a width of one of the plurality of hooks. A pin hole is formed through the first and second ears to receive a retention pin. The retention pin is inserted through the first ear into the eyelet of the hook and into the second ear. The hook pivots freely relative to the yoke. A pin bore is formed through a center of the base member to slidably receive the pull pin. The retention projection extends from a front end of the base member.

The hook cam preferably includes a cone base, at least two hook loops and a securement boss. A pin bore is formed through a center of the cone base. The at least two hook loops extend outward and backward from an outer surface of the cone base. The securement boss extends outward from the outer surface of the cone base. The swing arm of each hook makes contact with the outer surface of the cone base. The swing arm of each hook is inserted through one of the at least two hook loops. A threaded fastener is threaded into a securement boss to retain the pull pin, such that the pull pin does not axially move relative to the hook cam. The pull pin includes an eyelet portion, a V-portion and a rod portion. The eyelet portion extends from one end of the V-portion and the rod extends from an opposing end of the V-portion.

The fish housing preferably includes a bottom housing member, a left housing member and a right housing member. The fish housing has the general exterior shape of a small fish with a spoon extending from a front thereof. The bottom housing member includes a spoon section and a bottom housing body. The spoon section extends from a front of the bottom housing body. The spoon section includes a pull cavity. The pull cavity is sized to receive the V-portion of the pull pin. The bottom housing body includes a bottom hook compartment a bottom spring compartment and a bottom retainer cavity. The bottom retainer cavity is located at a front of the bottom housing body. The bottom hook compartment is located behind the bottom retainer cavity. A bottom hook slot is formed through a bottom of the bottom hook compartment to provide clearance for one of the plurality of hooks to extend through. The bottom spring compartment is located behind the bottom hook compartment.

The left housing member is preferably a mirror image of the right housing member. The left housing member includes a left hook compartment, a left spring compartment and a left retainer cavity. The left retainer cavity is located at a front of the left housing member. The left hook compartment is located behind the left retainer cavity. A left hook slot is formed through a side of the left hook compartment. The left spring compartment is located behind the left hook compartment. The right housing member includes a right hook compartment, a right spring compartment and a right retainer cavity. The right retainer cavity is located at a front of the right housing member. The right hook compartment is located behind the right retainer cavity. A right hook slot is formed through a side of the right hook compartment. The right spring compartment is located behind the right hook compartment.

The swing arm of each hook is inserted through its respective hook loop in the hook cam. The swing arm of each hook is then inserted into its respective yoke in the hook retainer. The retention pin is inserted through the pin hole in the yoke and through the eyelet at the end of the swing arm. The pull pin is inserted through pin holes in the hook retainer and hook cam. The compression spring is placed on an end of the pull pin. A spring clip is pushed on to an end of the pull pin to retain the compression spring. A hook assembly of the plurality of hooks, the hook retainer, the hook cam and pull pin are inserted into the bottom hook compartment, such that one of the plurality of hooks is aligned with the bottom hook slot and the retention projection of the hook retainer is placed in the bottom retainer cavity. The compression spring must be compressed, such that it is contained in only the bottom spring compartment. The compression spring biases the hook to stay inside the fish housing. A bottom of the left housing member is attached to a top of the bottom housing member with fasteners, adhesive or the like. A bottom of the right housing member is attached to a top of the bottom housing member with fasteners, adhesive or the like.

Accordingly, it is an object of the present invention to provide a fishing lure with actuated hooks, which provides a plurality of spring loaded hooks that are biased to stay inside a fishing lure housing unless a fishing line is pulled.

These and additional objects, advantages, features and benefits of the present invention will become apparent from the following specification.

DETAILED DESCRIPTION OF THE PREFERRED EMBODIMENTS

Figure 1:
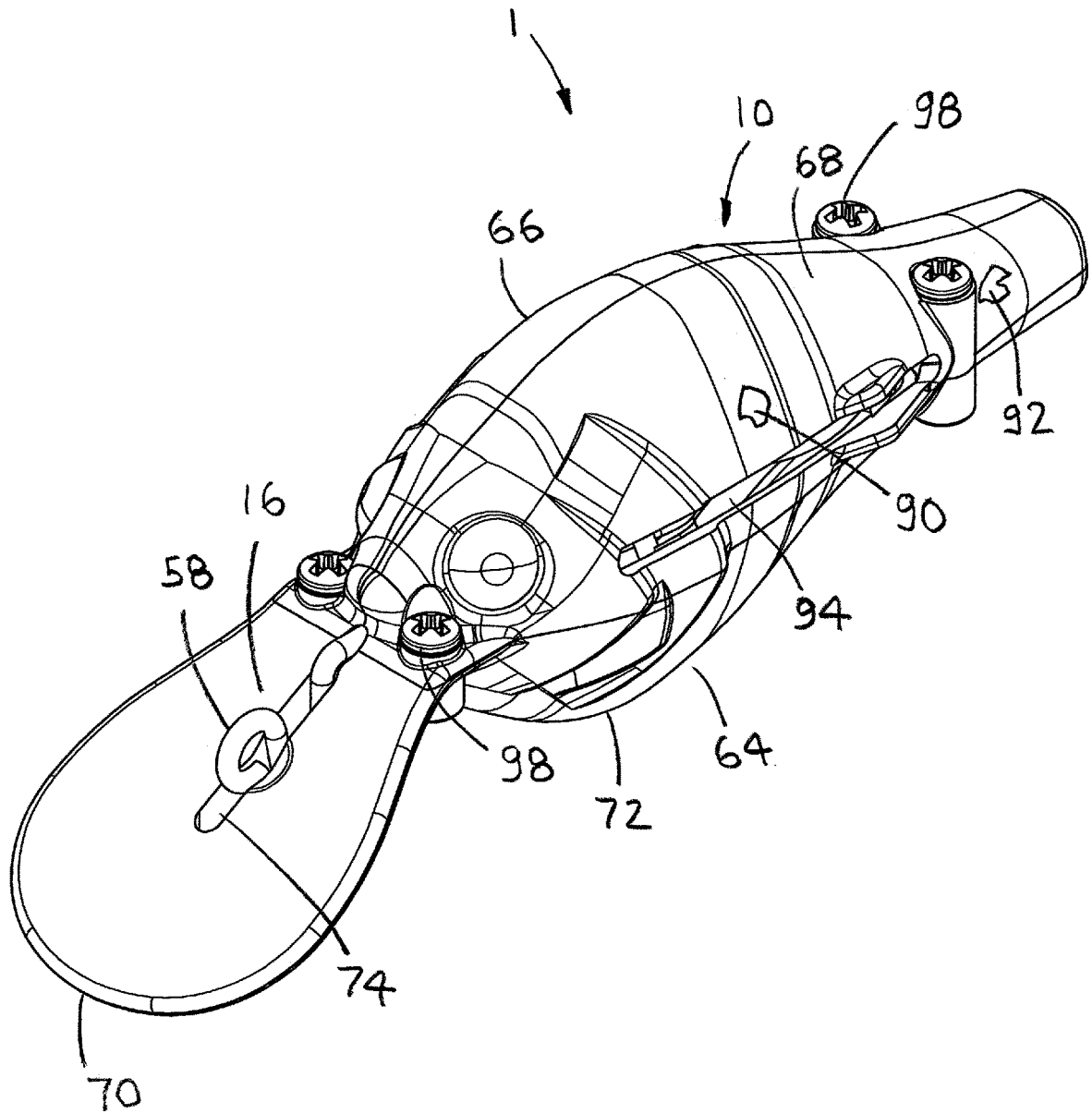
FIG. 1 is a perspective view of a fishing lure in accordance with the present invention.
Figure 2:
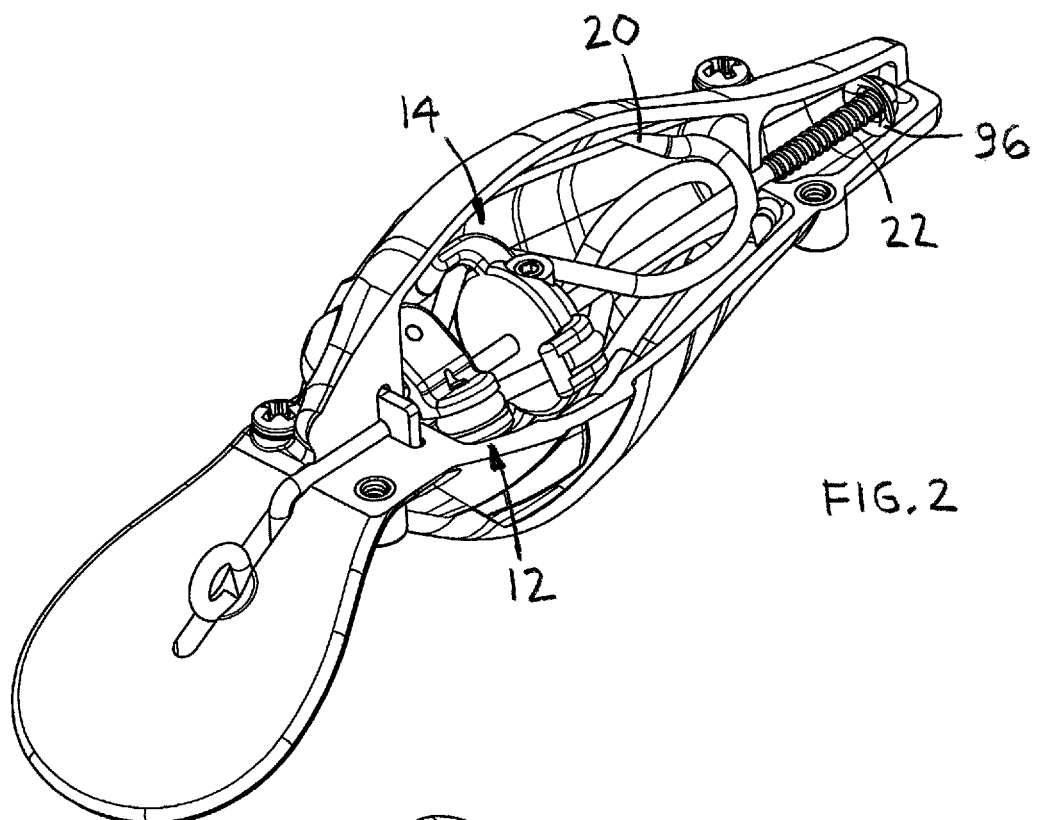
FIG. 2 is a perspective view of a fishing lure with a right housing member removed in accordance with the present invention.
Figure 3:
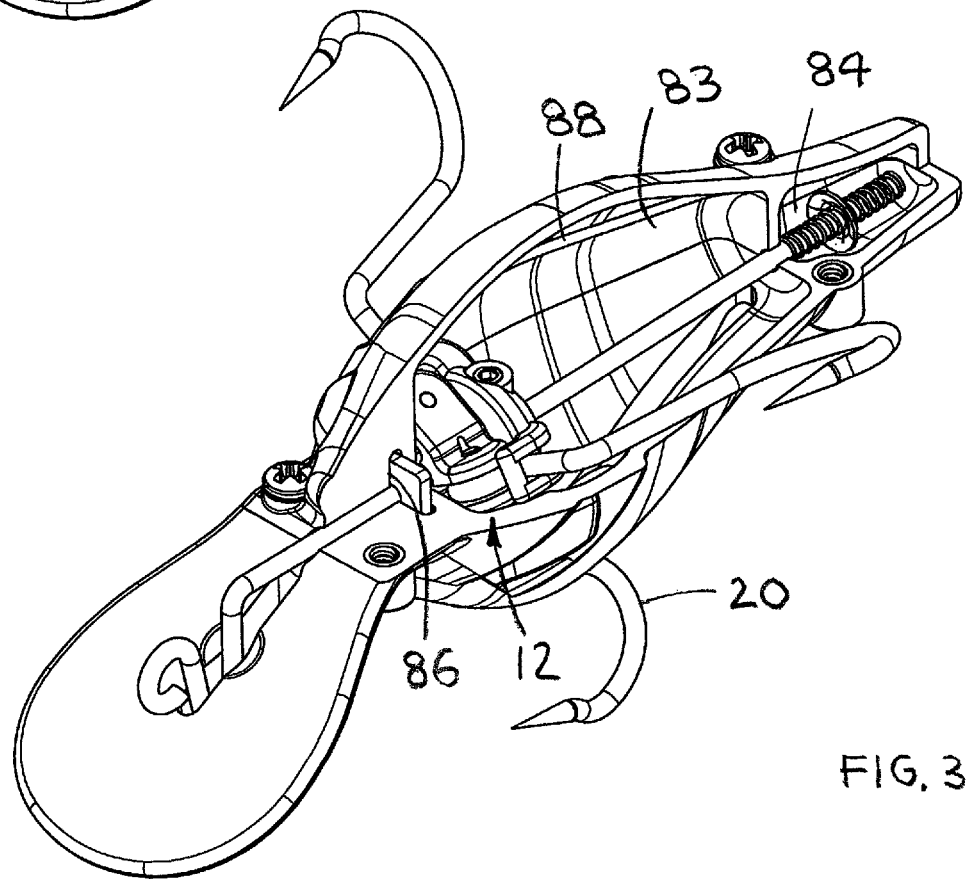
FIG. 3 is a perspective view of a fishing lure with a right housing member removed and hooks fully extended in accordance with the present invention.
Figure 4:
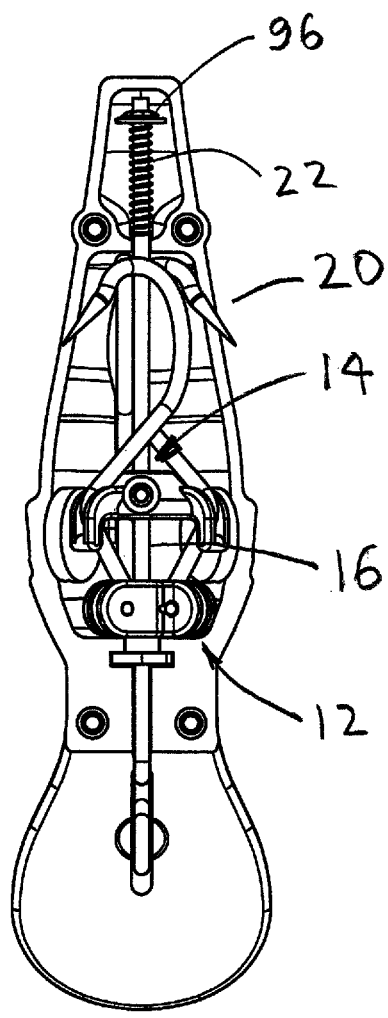
FIG. 4 is a top view of a fishing lure with left and right housing members removed in accordance with the present invention.
Figure 5:
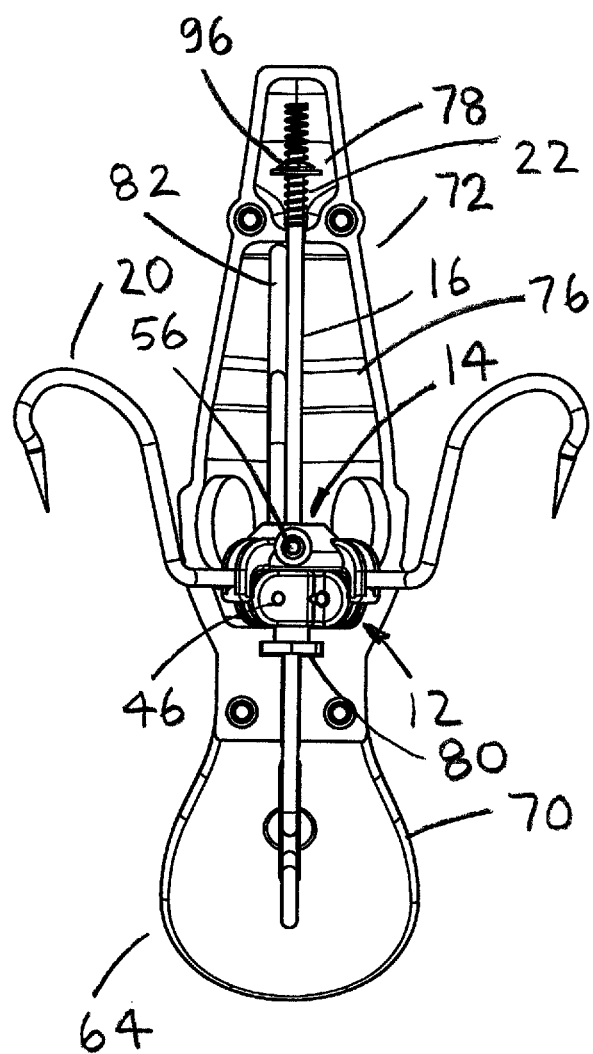
FIG. 5 is a top view of a fishing lure with left and right housing members removed and hooks fully extended in accordance with the present invention.
Figure 6:
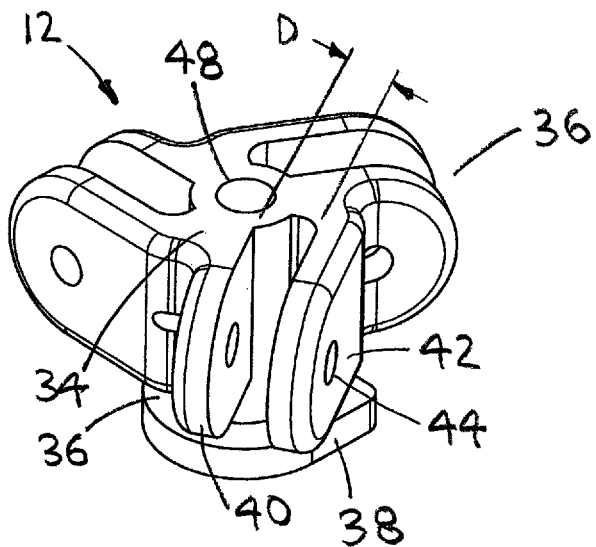
FIG. 6 is a perspective view of a hook retainer of a fishing lure in accordance with the present invention.
Figure 8:
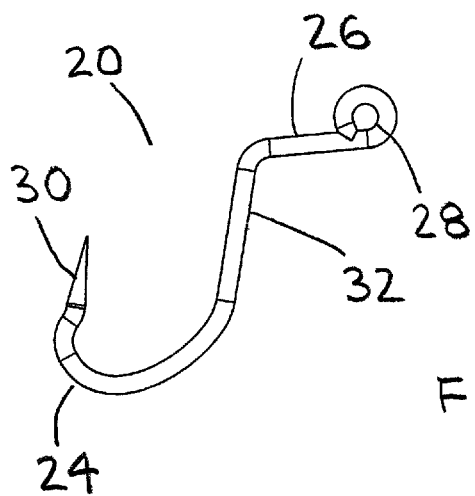
FIG. 8 is a side view of a hook of a fishing lure in accordance with the present invention.

With reference now to the drawings, and particularly to FIG. 1, there is shown a perspective view of a fishing lure 1. With reference to FIGS. 2-3, the fishing lure 1 preferably fish housing 10, a hook retainer 12, a hook cam 14, a pull pin 16, a plurality of hooks 20 and a compression spring 22. With reference to FIG. 8, each hook 20 includes a hook end 24, a swing arm 26 and an eyelet 28. The hook end 24 includes a barb end 30 and a rod end 32. The swing arm 26 extends outward substantially perpendicular to the rod end 32. The swing arm 26 is terminated with the eyelet 28. With reference to FIG. 6, the hook retainer 12 preferably includes a base member 34, at least two yokes 36 and a retention projection 38. The at least two yokes 36 extend from an outer perimeter of the base member 34. Each yoke 36 includes a first ear 40 and a second ear 42. A distance "D" between inner surfaces of the first and second ears 40, 42 is sized to receive a width of the swing arm 26 of one of the plurality of hooks 20. With reference to FIGS. 4-5, a pin hole 44 is formed through the first and second ears 40, 42 to receive a retention pin 46. The retention pin 46 is inserted through the pin hole 44 in the first ear 40, into the pin hole 28 of the hook 20 and into the pin hole 44 in the second ear. The hook 20 pivots freely relative to each yoke 36. A pin bore 48 is formed through a center of the base member 34 to slidably receive the pull pin 16. The retention projection 38 extends from a front end of the base member 34.

Figure 7:
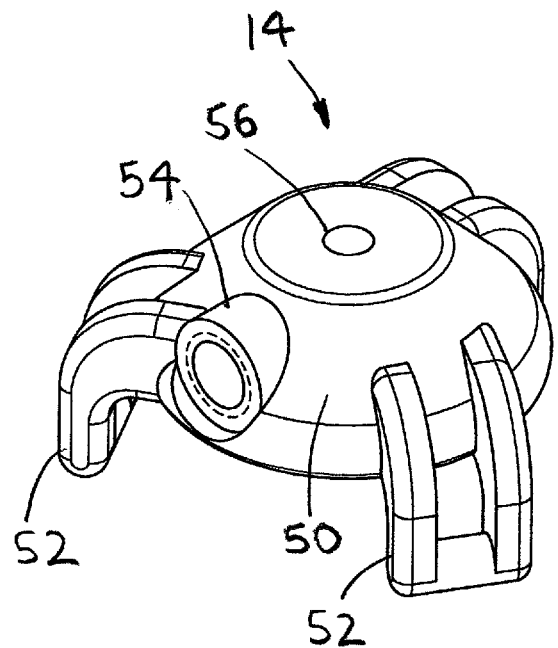
FIG. 7 is a perspective view of a hook cam of a fishing lure in accordance with the present invention.
Figure 9:
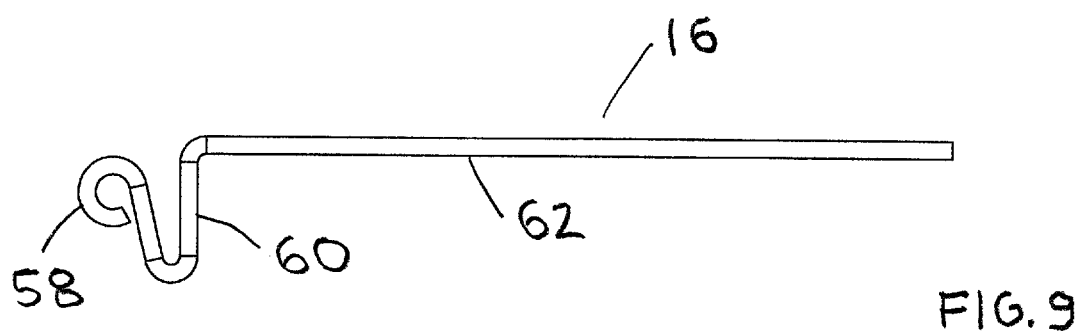
FIG. 9 is a side view of a pull pin of a fishing lure in accordance with the present invention.

With reference to FIG. 7, the hook cam 14 preferably includes a cone base 50, at least two hook loops 52 and a securement boss 54. A pin bore 56 is formed through a center of the cone base 50. The at least two hook loops 52 extend outward and backward from an outer surface of the cone base 50. A securement boss 54 extends outward from an outer surface of the cone base 50, between the at least two hook loops 52. The swing arm 26 of each hook makes contact with the outer surface of the cone base 50. The swing arm 26 of each hook 20 is inserted through one of the at least two hook loops 52. A threaded fastener 56 is threaded into the securement boss 54 and tightened against the pull pin 16, such that the pull pin 16 does not axially move relative to the hook cam 14. With reference to FIG. 9, the pull pin 16 includes an eyelet portion 58, a V-portion 60 and a rod portion 62. The eyelet portion 58 extends from one end of the V-portion 60 and the rod portion 62 extends from an opposing end of the V-portion 58.

The fish housing 10 preferably includes a bottom housing member 64, a left housing member 66 and a right housing member 68. The fish housing 10 has the general exterior shape of a small fish with a spoon extending from a front thereof. The bottom housing member 64 forms half of the fish housing 10; the left housing member 66 forms a quarter of the fish housing 10; and the right housing member 68 forms a quarter of the fish housing 10. The left and right housing members 66, 68 form a top half of the fish housing 10. The bottom housing member 64 includes a spoon section 70 and a bottom housing body 72. The spoon section 70 extends from a front of the bottom housing body 72. The spoon section 70 includes a pull cavity 74. The pull cavity 74 is sized to receive the V-portion 60 of the pull pin 16. The pull cavity 74 limits axial movement of the pull pin 16 relative to the fish housing 10. The bottom housing body 72 includes a bottom hook compartment 76, a bottom spring compartment 78 and a bottom retainer cavity 80. The bottom retainer cavity 80 is located at a front of the bottom housing body 72. The bottom hook compartment 76 is located behind the bottom retainer cavity 80. A bottom hook slot 82 is formed through a bottom of the bottom hook compartment 76. The bottom spring compartment 78 is located behind the bottom hook compartment 76.

The left housing member 66 is preferably a mirror image of the right housing member 68. The left housing member 66 includes a left hook compartment 83, a left spring compartment 84 and a left retainer cavity 86. The left retainer cavity 86 is located at a front of the left housing member 66. The left hook compartment 83 is located behind the left retainer cavity 86. A left hook slot 88 is formed through a side of the left hook compartment 83. The left spring compartment 84 is located behind the left hook compartment 83. The right housing member 68 includes a right hook compartment 90, a right spring compartment 92 and a right retainer cavity (not shown). The right retainer cavity is located at a front of the right housing member 68. The right hook compartment 90 is located behind the right retainer cavity. A right hook slot 94 is formed through a side of the right hook compartment 90. The right spring compartment 92 is located behind the right hook compartment 90.

The fishing lure 10 is preferably assembled in the following manner. The swing arm 26 of each hook 20 is inserted through its respective hook loop 52 in the hook cam 14. The swing arm 26 of each hook 20 is then inserted into its respective yoke 36 in the hook retainer 12. The retention pin 46 is inserted through the pin hole 44 in the yoke 36 and through the eyelet 28 at the end of the swing arm 26. The pull pin 16 is inserted through pin holes 48, 56 in the hook retainer 12 and the hook cam 14. The compression spring 22 is placed on an end of the pull pin 16. A spring clip 96 is pushed on to an end of the pull pin 16 to retain the compression spring 22. A hook assembly of the plurality of hooks 20, the hook retainer 12, the hook cam 14 and pull pin 16 are inserted into the bottom hook compartment 76, such that one of the plurality of hooks 20 is aligned with the bottom hook slot 82 and the retention projection 38 of the hook retainer 12 is placed in the bottom retainer cavity 80. The compression spring 22 must be compressed, such that it is contained in only the bottom spring compartment 78. The compression spring 22 biases the hook to stay inside the fish housing 10. A bottom of the left housing member 66 is attached to a top of the bottom housing member 64 with fasteners 98, adhesive or the like. A bottom of the right housing member 68 is attached to a top of the bottom housing member 64 with fasteners 98, adhesive or the like. A fishing line is secured to the eyelet portion 58. Pulling the fishing line will cause the at least two hooks 20 to extend outside fish housing 10. The compression spring 22 will cause the at least two hooks 20 to retract into the fish housing 10.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A fishing lure with actuated hooks comprising:
   a fish housing including a front section, a pull cavity formed in said front section;
   at least two hooks each include a pivoting end and a barbed end;
   a pull pin includes an eyelet portion, a V-portion and a rod portion, said eyelet portion extends from one end of said V-portion, said rod portion extends from an opposing end of said V-portion, said pull cavity sized to receive said V-portion, said pull cavity limits axial movement of said pull pin relative to the fish housing, said pull pin slides relative to said fish housing, a fishing line attached to said eyelet portion;
   a hook retainer pivotally retains said pivoting end of each one of said at least two hooks, said pull pin slides relative to said hook retainer, said hook retainer is secured in said fish housing, such that it does not rotate relative to said fish housing; and
   a hook cam includes a cone base, said cone base secured to said pull pin, wherein a bottom perimeter edge of said cone base makes contact with said at least two hooks, wherein pulling of the fishing line causes linear movement of said pull pin which forces said barbed ends of said at least two hooks to extend outside of said fish housing through linear movement of said hook cam.

2. The fishing lure with actuated hooks of claim 1, wherein:
   said hook retainer includes a base and at least two yokes, said at least two yokes extend from said base, said pivoting end of said at least two hooks are retained in said at least two yokes.

3. The fishing lure with actuated hooks of claim 1, wherein:
   said hook cam includes said cone base and at least two hook loops, said at least two hook loops extend outward and behind said cone base, one of said at least two hooks is retained in one of said at least two hook loops.

4. The fishing lure with actuated hooks of claim 1, wherein:
   said fish housing includes a bottom housing member, a left housing member and a right housing member, said bottom housing member forms a bottom half of the fish housing, said left and right housing members form a top half of the fish housing.

5. The fishing lure with actuated hooks of claim 1, further comprising:
   a compression spring retained on an end of said pull pin, a spring clip pushed on to an end of said pull pin to retain said compression spring on said pull pin, said compression spring used to bias said at least two hooks to stay inside said fish housing.

6. A fishing lure with actuated hooks comprising:
   a fish housing including a front portion;
   at least two hooks each include a pivoting end and a barbed end;
   a compression spring;
   a pull pin slidably retained in said fish housing, said pull pin inserted into said compression spring, one end of said pull pin terminated to retain one end of said compression spring, the other end of said compression spring restrained by said fish housing, said compression spring used to bias said at least two hooks to stay inside said fish housing, a fishing line attached to said pull pin;
   a hook retainer pivotally retains said pivoting end of each one of said at least two hooks, said pull pin slides relative to said hook retainer, said hook retainer is secured in said fish housing, such that it does not rotate relative to said fish housing; and
   a hook cam includes a cone base, said cone base secured to said pull pin, wherein said cone base makes contact with said at least two hooks, wherein pulling of the fishing line causes linear movement of said pull pin which forces said barbed ends of said at least two hooks to extend outside said fish housing through linear movement of said hook cam.

7. The fishing lure with actuated hooks of claim 6, wherein:
   said hook retainer includes a base and at least two yokes, said at least two yokes extend from said base, said pivoting end of said at least two hooks are retained in said at least two yokes.

8. The fishing lure with actuated hooks of claim 6, wherein:
   said hook cam includes said cone base and at least two hook loops, said at least two hook loops extend outward and behind said cone base, one of said at least two hooks retained in one of said at least two hook loops.

9. The fishing lure with actuated hooks of claim 6, wherein:
   said fish housing includes a bottom housing member, a left housing member and a right housing member, said bottom housing member forms a bottom half of the fish housing, said left and right housing members form a top half of the fish housing.

10. The fishing lure with actuated hooks of claim 6, further comprising:
    a spring clip pushed on to an end of said pull pin to retain said compression spring on said pull pin.

11. The fishing lure with actuated hooks of claim 6, wherein:
    said pull pin includes an eyelet portion, a V-portion and a rod portion, said eyelet portion extends from one end of said V-portion, said rod portion extends from an opposing end of said V-portion.

12. A fishing lure with actuated hooks comprising:
    a fish housing including a front portion;
    at least three hooks each include a pivoting end and a barbed end;
    a pull pin slidably retained in said fish housing, a fishing line attached to said eyelet portion;
    a hook retainer retains pivotally said pivoting end of each one of said at least three hooks, said pull pin slides relative to said hook retainer, said hook retainer is secured in said fish housing, such that it does not rotate relative to said fish housing; and a hook cam includes a cone base, said cone base secured to said pull pin, wherein a bottom perimeter edge of said cone base makes contact with said at least three hooks, wherein pulling of the fishing line causes linear movement of said pull pin which forces said barbed ends of said at least three hooks to extend outside of said fish housing through linear movement of said hook cam.

13. The fishing lure with actuated hooks of claim 12, wherein:
said hook retainer includes a base and at least three yokes, said at least three yokes extend from said base, said pivoting end of said at least three hooks are retained in said at least three yokes.

14. The fishing lure with actuated hooks of claim 12, wherein:
said hook cam includes said cone base and at least three hook loops, said at least three hook loops extend outward and behind said cone base, one of said at least three hooks retained in one of said at least hook three loops.

15. The fishing lure with actuated hooks of claim 12, wherein:
said fish housing includes a bottom housing member, a left housing member and a right housing member, said bottom housing member forms a bottom half of the fish housing, said left and right housing members form a top half of the fish housing.

16. The fishing lure with actuated hooks of claim 12, further comprising:
a compression spring retained on an end of said pull pin, a spring clip pushed on to an end of said pull pin to retain said compression spring on said pull pin, said compression spring used to bias said at least three hooks to stay inside said fish housing.

17. The fishing lure with actuated hooks of claim 12, wherein:
said pull pin includes an eyelet portion, a V-portion and a rod portion, said eyelet portion extends from one end of said V-portion, said rod portion extends from an opposing end of said V-portion.

* * * * *